US012810567B2

(12) United States Patent
Norris

(10) Patent No.: US 12,810,567 B2
(45) Date of Patent: Nov. 24, 2026

(54) DIGITAL HARMONY VISUALIZATION OF COLOR PROPERTIES BETWEEN OBJECTS

(71) Applicant: PPG Industries Ohio, Inc., Cleveland, OH (US)

(72) Inventor: Alison M. Norris, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 68 days.

(21) Appl. No.: 18/835,121

(22) PCT Filed: Feb. 1, 2023

(86) PCT No.: PCT/US2023/061731
§ 371 (c)(1),
(2) Date: Aug. 1, 2024

(87) PCT Pub. No.: WO2023/150536
PCT Pub. Date: Aug. 10, 2023

(65) Prior Publication Data

US 2025/0131673 A1 Apr. 24, 2025

Related U.S. Application Data

(60) Provisional application No. 63/267,455, filed on Feb. 2, 2022.

(51) Int. Cl.
*G06T 7/00* (2017.01)
*G06T 7/70* (2017.01)
(Continued)

(52) U.S. Cl.
CPC ................ *G06T 19/20* (2013.01); *G06T 7/70* (2017.01); *G06T 7/90* (2017.01); *G06T 15/50* (2013.01);
(Continued)

(58) Field of Classification Search
None
See application file for complete search history.

(56) References Cited

U.S. PATENT DOCUMENTS

| | | | |
|---|---|---|---|
| 5,311,212 | A | 5/1994 | Beretta |
| 5,682,505 | A | 10/1997 | Usami et al. |

(Continued)

FOREIGN PATENT DOCUMENTS

| | | | |
|---|---|---|---|
| AU | 2001284782 | A1 | 2/2002 |
| CA | 2890158 | A1 | 5/2014 |

(Continued)

OTHER PUBLICATIONS

International Search Report and Written Opinion received for PCT Application Serial No. PCT/US2023/061731 dated May 17, 2023, 8 pages.

*Primary Examiner* — Zhihan Zhou

(57) ABSTRACT

A color display system for providing a virtual harmony evaluation between objects. A virtual harmony visualization may depict a digital representation of particular coatings applied to particular objects and may be based on selections made by a viewer. The particular coatings and particular objects may be defined by color data including attributes of a coating and spatial orientation data including attributes of a three-dimensional object. The digital representation of the virtual harmony visualization may also be based on attributes of a selected light source and/or predicted weathering which modifies the color data or the appearance of the coatings in the virtual harmony visualization.

19 Claims, 9 Drawing Sheets

(51) Int. Cl.

| | |
|---|---|
| ***G06T 7/90*** | (2017.01) |
| ***G06T 15/50*** | (2011.01) |
| ***G06T 19/00*** | (2011.01) |
| ***G06T 19/20*** | (2011.01) |

(52) U.S. Cl.

CPC *G06T 2200/24* (2013.01); *G06T 2207/10024* (2013.01); *G06T 2219/2012* (2013.01)

(56) References Cited

U.S. PATENT DOCUMENTS

| | | | |
|---|---|---|---|
| 6,040,924 | A | 3/2000 | Tamagaki et al. |
| 6,549,213 | B1 | 4/2003 | Sadka |
| 6,863,534 | B1 | 3/2005 | Sadka |
| 6,893,265 | B2 | 5/2005 | Sadka |
| 7,392,204 | B1 | 6/2008 | Matsumoto et al. |
| 7,536,048 | B2 | 5/2009 | Moravec et al. |
| 8,013,869 | B2 | 9/2011 | Voliter et al. |
| 8,427,498 | B2 | 4/2013 | Ou et al. |
| 9,134,179 | B2 | 9/2015 | Chong et al. |
| 9,930,220 | B2 | 3/2018 | Urban et al. |
| 10,107,687 | B2 | 10/2018 | Minchew et al. |
| 10,311,509 | B2 | 6/2019 | Rice et al. |
| 10,387,938 | B2 | 8/2019 | Miller et al. |
| 2002/0154112 | A1 * | 10/2002 | Voye ....................... G06T 15/50 345/419 |
| 2010/0194775 | A1 | 8/2010 | Ou et al. |
| 2010/0194776 | A1 | 8/2010 | Chong et al. |
| 2014/0282185 | A1 | 9/2014 | Letts |
| 2014/0348421 | A1 | 11/2014 | Urban et al. |
| 2015/0077639 | A1 | 3/2015 | Chamaret et al. |
| 2015/0205864 | A1 | 7/2015 | Fuzell-Casey et al. |
| 2015/0268098 | A1 | 9/2015 | Minchew et al. |
| 2016/0055655 | A1 | 2/2016 | Chamaret et al. |
| 2019/0385210 | A1 | 12/2019 | Miller et al. |
| 2020/0089991 | A1 * | 3/2020 | Steenhoek .............. G06T 11/10 |
| 2021/0065440 | A1 * | 3/2021 | Sunkavalli ................ G06T 7/90 |
| 2022/0113193 | A1 * | 4/2022 | Paredes ................ G01N 21/255 |

FOREIGN PATENT DOCUMENTS

| | | | |
|---|---|---|---|
| CA | 2931237 | A1 | 12/2016 |
| CN | 1898692 | A | 1/2007 |
| CN | 105761115 | A | 7/2016 |
| DE | 69032768 | | 12/1998 |
| DE | 69800685 | T2 | 9/2001 |
| EP | 0414415 | A2 | 2/1991 |
| EP | 0895133 | A2 | 2/1999 |
| EP | 1555634 | A1 | 7/2005 |
| EP | 2176854 | A1 | 4/2010 |
| EP | 2806401 | A1 | 11/2014 |
| EP | 2806403 | A1 | 11/2014 |
| EP | 2849425 | A1 | 3/2015 |
| EP | 2849426 | A1 | 3/2015 |
| EP | 2979244 | A2 | 2/2016 |
| EP | 3038059 | A1 | 6/2016 |
| JP | 01-309187 | A | 12/1989 |
| JP | 03-081877 | A | 4/1991 |
| JP | 2685810 | B2 | 12/1997 |
| JP | 3352914 | B2 | 12/2002 |
| JP | 2003-058581 | A | 2/2003 |
| JP | 2010-124477 | A | 6/2010 |
| JP | 2015-520467 | A | 7/2015 |
| KR | 10-1991-0005188 | A | 3/1991 |
| RU | 2010103129 | A | 8/2011 |
| RU | 2505867 | C2 | 1/2014 |
| WO | 2005/048158 | A1 | 5/2005 |
| WO | 2008/033382 | A2 | 3/2008 |
| WO | 2009/009672 | A1 | 1/2009 |
| WO | 2009/009745 | A1 | 1/2009 |
| WO | 2012/001048 | A1 | 1/2012 |
| WO | 2013/189840 | A1 | 12/2013 |
| WO | 2014/070914 | A1 | 5/2014 |
| WO | 2014/154753 | A2 | 10/2014 |
| WO | 2014/154755 | A2 | 10/2014 |
| WO | 2015/189369 | A1 | 12/2015 |
| WO | 2020163131 | A1 | 8/2020 |

* cited by examiner

DIGITAL HARMONY VISUALIZATION OF COLOR PROPERTIES BETWEEN OBJECTS

CROSS-REFERENCE TO RELATED APPLICATIONS

This application claims the benefit of and priority to U.S. Provisional Patent Application Ser. No. 63/267,455 filed on 2 Feb. 2022 and entitled "DIGITAL HARMONY VISUALIZATION OF COLOR PROPERTIES BETWEEN OBJECTS," which application is expressly incorporated herein by reference in its entirety.

TECHNICAL FIELD

The present invention relates to computer-implemented methods and systems for utilizing technological improvements to aid in displaying desired materials.

BACKGROUND

Modern coatings provide various functions in industry and society. For example, different objects and structures, including vehicles and buildings, may be coated using paints or various other coatings in order to protect components from the elements (e.g., to protect against rust formation) or to provide aesthetic visual effects. Whenever a coated object is viewed, the aesthetic visual effects perceived are the result of complex relationships between the properties of a coating and viewing conditions, such that it is challenging to achieve an accurate color match or pleasing color harmony between two or more coated objects.

In some cases, a coating mixed, used, or even viewed under different conditions may exhibit varied appearances. Visual properties of a coating (e.g., color, visual effects, texture, etc.) may be determined, in part, based on a chemical composition of the coating and may vary according to time of manufacture, geographic location where the coating was applied (e.g., due to changes in altitude, climate, air quality, weather, etc.), solvent, coating orientation, substrate composition, or other environmental factors. Visual perception of color harmony between two coatings or coated objects may vary based on viewing conditions such as lighting (e.g., intensity, clarity, orientation, etc.), distance (e.g., between coatings/objects, from observer), relative orientation, surrounding colors or objects, or other environmental conditions. Even when two different coated objects have coatings with the same chemical composition, the objects may have different visual perceptions based upon differences in climate conditions when the objects were coated.

Accordingly, there are several challenges within the art that can be benefited by technical advancements. The subject matter claimed herein is not limited to cases that solve any disadvantages or that operate only in environments such as those described above. Rather, this background is only provided to illustrate one exemplary technology area where some computer-implemented methods and systems described herein may be practiced.

BRIEF SUMMARY

A method is provided to facilitate a comparison process in which a color harmony between a first object and a second object is evaluated. For example, a system performing the method may be configured to receive first color data and first spatial orientation data of a first physical object for generating a first visualization for the first visual object, and to receive second color data and second spatial orientation data of a second physical object for generating a second visualization for the second visual object. The color data may be provided or selected from a coating database and may include attributes of a respective coating. Spatial orientation data of an object may comprise data defining a size, shape, and position of the object in a coordinate plane and may be provided or selected from an object database. Further, in generating the first visualization and the second visualization, the system may determine light source data for use with the respective color data and spatial orientation data.

Within a user interface, the system may display (i) the first visualization or rendering for the first visual object and (ii) the second visualization or rendering for the second visual object as part of a digital harmony visualization, for example with respect to a predetermined observer position relative to the objects and the determined light source data. The system allows a digital harmony evaluation of the first object and the second object under standardized conditions, allowing a user to determine whether a combined appearance of the first object and the second object is acceptable. An input may be received at the user interface defining the digital harmony visualization as acceptable or unacceptable, for defining a tolerance range of color harmony between the first object and the second object.

A computer system is configured to compare multiple objects in a digital harmony visualization for determining a color harmony between the objects, where color data for available coatings, light source data, and orientation data are provided to the system. The system may be configured to define color properties of a printing device or a display device, and to process the first visualization and the second visualization based on the defined color properties, for adjusting a printed or displayed appearance of the first visualization and the second visualization provided by the printing device or the display device.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific examples thereof, which are illustrated in the appended drawings. Understanding that these drawings depict only typical examples of the invention and are not therefore to be considered to be limiting of its scope, the invention will be described and explained with additional specificity and detail through the use of the accompanying drawings, which are described below.

DETAILED DESCRIPTION

Figure 1:
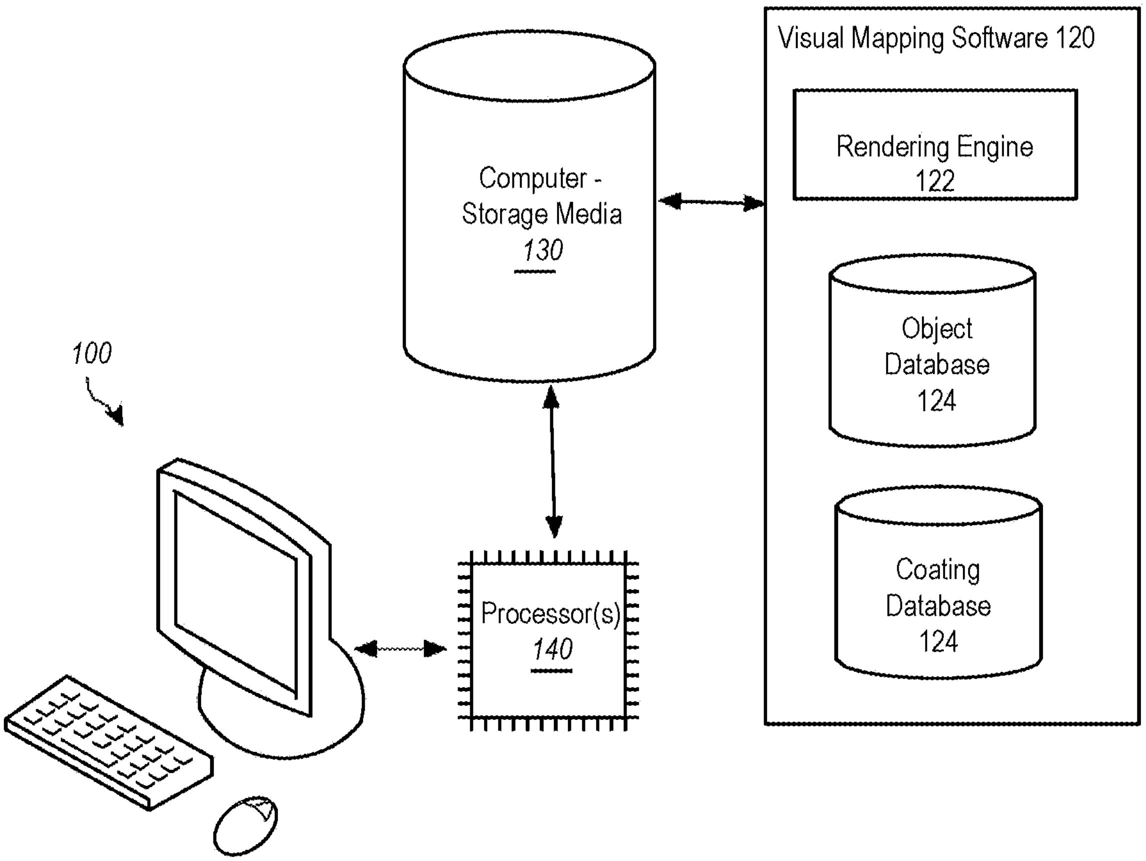
FIG. 1 illustrates a computer system for generating a digital harmony visualization as disclosed herein.

Accurately rendering colors is challenging on a digital display. Significant research and work have been done using various color-calibration techniques in order to bring a display's colors in closer alignment to colors within the physical world. In many cases, these technical tools are expensive, cumbersome, and/or limited.

Disclosed computer systems and methods provide unique solutions to challenges within this technical space. In particular, disclosed computer systems and methods are able to display objects having various coatings, and in particular coatings with effect pigments, in ways that accurately reflect their appearance in standardized, real-world conditions. In some configurations, a computer system may utilize display or printer calibration tools in order to create an accurate representation of color; however, the disclosed technology does not necessarily require unique color calibration tools or other expensive and cumbersome calibration steps.

The methods and systems of the instant disclosure provide significant advantages in addressing the complex variations that occur in visual properties of coatings, such as may occur in the automotive industry where ensuring color harmony between components painted in different locations presents a particular challenge. In the automotive industry example, a front fender panel of a vehicle may be painted at a manufacturing plant in a first state while a bumper for the same vehicle may be painted at a manufacturing plant in a second state. Even if the same coating formulation is used in both manufacturing plants, variations in altitude, climate, air quality, weather, etc. between the states or even the manufacturing plants can reduce confidence in the parts "matching" each other. Increasing the difficulty of ensuring color harmony between the bumper and the fender is the fact that even a direct visual comparison between the resulting painted parts in a single location is dependent on the viewing conditions at the time of the comparison (e.g., lighting, relative orientation and position, surrounding colors or objects, etc.). Even when parts are able to be identified as not matching, whether painted with the same coating formulation or not, manufacturers are left with the problem of where to find another bumper or fender that is an acceptable match. Similar challenges are presented in ensuring color harmony for after-market parts and in painting repaired parts. The methods and systems of the current application overcome these challenges by providing a unique digital harmony visualization.

The present disclosure extends to computerized systems and methods for providing a digital harmony visualization designed to have a particular visual layout. This layout is designed to enable the display of multiple different objects including color coatings thereon and is further designed to facilitate comparison between those objects at selected positions, orientations, and conditions. For instance, the system may be used in a design setting where potential coatings (applied or used at external coating systems) are being compared for color harmony when used on multiple objects having particular shapes, positions, and orientations, to determine whether selected coatings are acceptable for real-world use together. Notably, the coatings are selected with respect to color data representing physical measurements of exemplary coatings (e.g., spectral measurements of color) and the objects having the coatings may be rendered with respect to the color data, an orientation and position of the objects, an orientation and position of an observer, and predetermined light conditions. That is, a digital harmony evaluation of the objects may be accurately performed. Optional peripheral devices may be provided with the system, such as a spectrophotometer, colorimeter, 3D scanner or the like.

FIG. 1 illustrates a color display computer system 100 for generating a digital harmony evaluation of a first physical object and a second physical object. The depicted computer system 100 comprises one or more processor(s) 140 and computer-storage media 130. The computer-storage media 130 may comprise executable instructions that when executed by the one or more processors 140 may configure the computer system 100 to initiate visual mapping software 120. The visual mapping software 120 may comprise a rendering engine 122, an object database 124, and a coating database 126.

As used herein, a "module" comprises computer-executable code and/or computer hardware that performs a particular function. One of skill in the art will appreciate that the distinction between different modules is at least in part arbitrary and that modules may be otherwise combined and divided and still remain within the scope of the present disclosure. As such, the description of a component as being a "module" is provided only for the sake of clarity and explanation and should not be interpreted to indicate that any particular structure of computer-executable code and/or computer hardware is required, unless expressly stated otherwise. In this description, the terms "component", "agent", "manager", "service", "engine", "virtual machine" or the like may also similarly be used.

The computer system 100 may be configured to display a digital harmony visualization of objects having coatings thereon, the digital harmony visualization comprising a rendering of the objects based on color data of the respective coatings, an orientation of the objects, and light source data, for evaluating a color harmony of the objects. As used herein, "color data" may comprise a digital representation of a particular coating applied to a surface (e.g., including color, visual effects, texture, anisotropy, metamerism index, etc.). The color data for a particular coating may be distinguished by spray orientation, weathering, substrate material (e.g., of the object), etc. The color data may include spectrophotometric measurement data or similar measurement data. The objects may have the same relative shape as a given conventional object that may be known to those having skill in the art and, as used herein, "spatial orientation data" for a given object may comprise a digital representation of the object in a three-dimensional coordinate system. For example, the objects may be displayed as a rendering of their actual form (e.g., a fender and a bumper) and/or as virtual panels, such as based upon user input or selection (e.g., by measurement with a 3D scanner or use of object data such as CAD models). Accordingly, the objects may comprise a plurality of three-dimensional flat and/or curved surfaces with certain relative positions in space, morphologies, etc. Either of the color data and/or the spatial orientation data may further comprise a digital representation of material properties of the surface (e.g., plastic, metal, reflective properties, etc.)

"Light source data" may comprise a digital representation of light sources in a three-dimensional space (e.g., intensity, clarity, position, orientation, etc.). Multiple light sources may include sunlight of varying intensity and clarity, point light, diffuse light, incandescent light, fluorescent light, LED light, etc. The light source data may be used to modify the color data in a given rendering (e.g., with respect to anisotropy, metamerism, brightness, color, etc.), and may include a digital representation of shadows and reflected light influenced by the color data and the orientation of the objects. The light source data may include color brightness and/or color temperature, such as a range of color brightness and/or a range of color temperatures.

As part of a digital harmony visualization, the computer system 100 may display a digital rendering of a first coating applied to a first object and a second coating applied to a second object for a set of conditions defined by first color data, first spatial orientation data, second color data, second spatial orientation data, and light source data. For example, FIGS. 2A-2B display a user interface 200 that depicts three-dimensional objects 210 including a first object 220 in the form of a bumper of a stylized car and a second object 230 in the form of a body of the stylized car. One will appreciate, however, that the stylized car is merely exemplary, and in other examples the three-dimensional objects 210 may form a house, furniture, a sign, a computer, clothing, an airplane, or any other coated objects.

In the depicted example, the first object 220 and the second object 230 comprise different coating materials, one being a water-borne coating and the other a solvent-borne coating. In another example, not shown, the first object 220 and the second object 230 may be formed of different materials, for example a fender may be made of a metal while a bumper may be made of a plastic material. The digital renderings described according to the current disclosure may thereby account for actual differences in coating material and/or in the material of the objects themselves. Additionally, a particular light source 240 is depicted, the light source applying lighting attributes to both the first object 220 and the second object 230 based on the position and respective properties of the light source. For example, both the first object 220 and the second object 230 may be rendered with the exact same virtual lighting conditions applied to both renderings or with different virtual lighting conditions.

In some cases, a viewer may be able to individually select components that affect a coating. For example, the viewer may select between a water-borne coating and a solvent-borne coating, a stack of coatings (e.g., e-coat, primer, basecoat, clearcoat, monocoat, etc.), additives (e.g., aluminum flakes for sparkle, etc.), texture from different material substrates (e.g., plastic vs metal substrate), spray directionality, etc. to create a particular object that demonstrates a potential coating. In response, the rendering engine 122 renders the object having the selected coating.

A person having skill in the art will appreciate that coatings may have complex associated visual appearances. For example, an appearance of a coating may change based upon the angle at which a viewer sees the coating and/or the angle of a light source on the coating. Rendering the first object 220 and the second object 230 next to each other allows a viewer to appreciate the impact of distance, light, and orientation in unique and novel ways. For example, a color of the first object 220 may in some cases appear to be in harmony, or visually compatible, with a color of the second object 230 simply based upon a viewing distance.

Figure 2A:
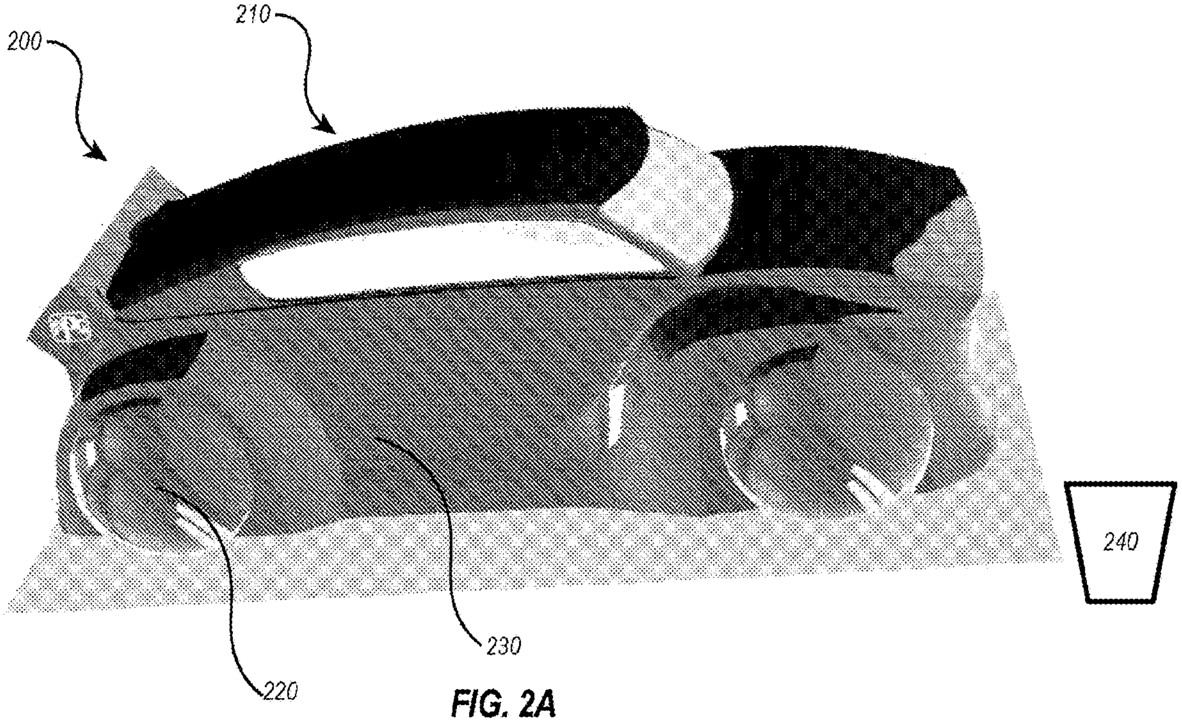
FIG. 2A illustrates a user interface for visualizing a first coated object and a second coated object at a "far view."
Figure 2B:
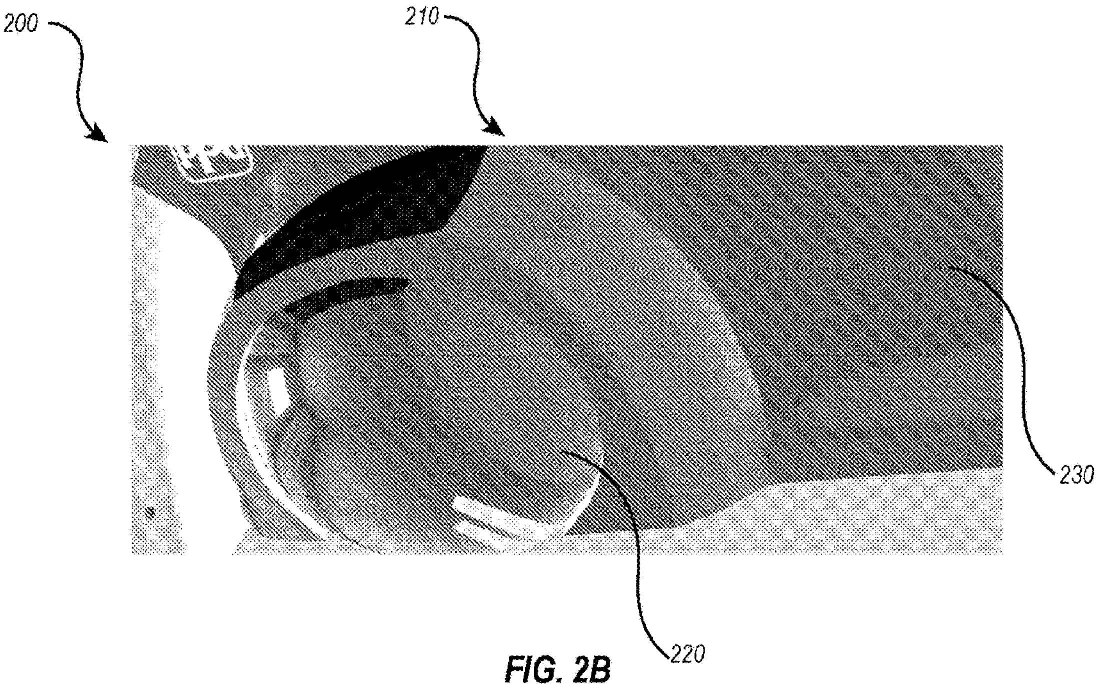
FIG. 2B illustrates the user interface of FIG. 2A for visualizing the first coated object and the second coated object at a "close view."

A typical view of the viewer may be from a "far away" distance, as shown in FIG. 2A, such that the color of the first object 220 appears to be in harmony with the color of the second object 230. As shown in FIG. 2B, in contrast, a view from a "close up" distance may provide a different perspective to the viewer such that the viewer can appreciate that the perceived harmony was influenced by surrounding colors or an involuntary "blending" of the colors in the viewer's mind because of scale. As such, the digital rendering of the first object 220 and the second object 230 in the digital harmony visualization may enable a viewer to accurately evaluate real-world color harmony between objects, for example when determining whether painting a bumper with a water-borne coating is acceptable where the body of the car is painted with a solvent-borne coating, when coatings are applied to different substrate (e.g., plastic bumper versus metal body), etc.

Figure 3:
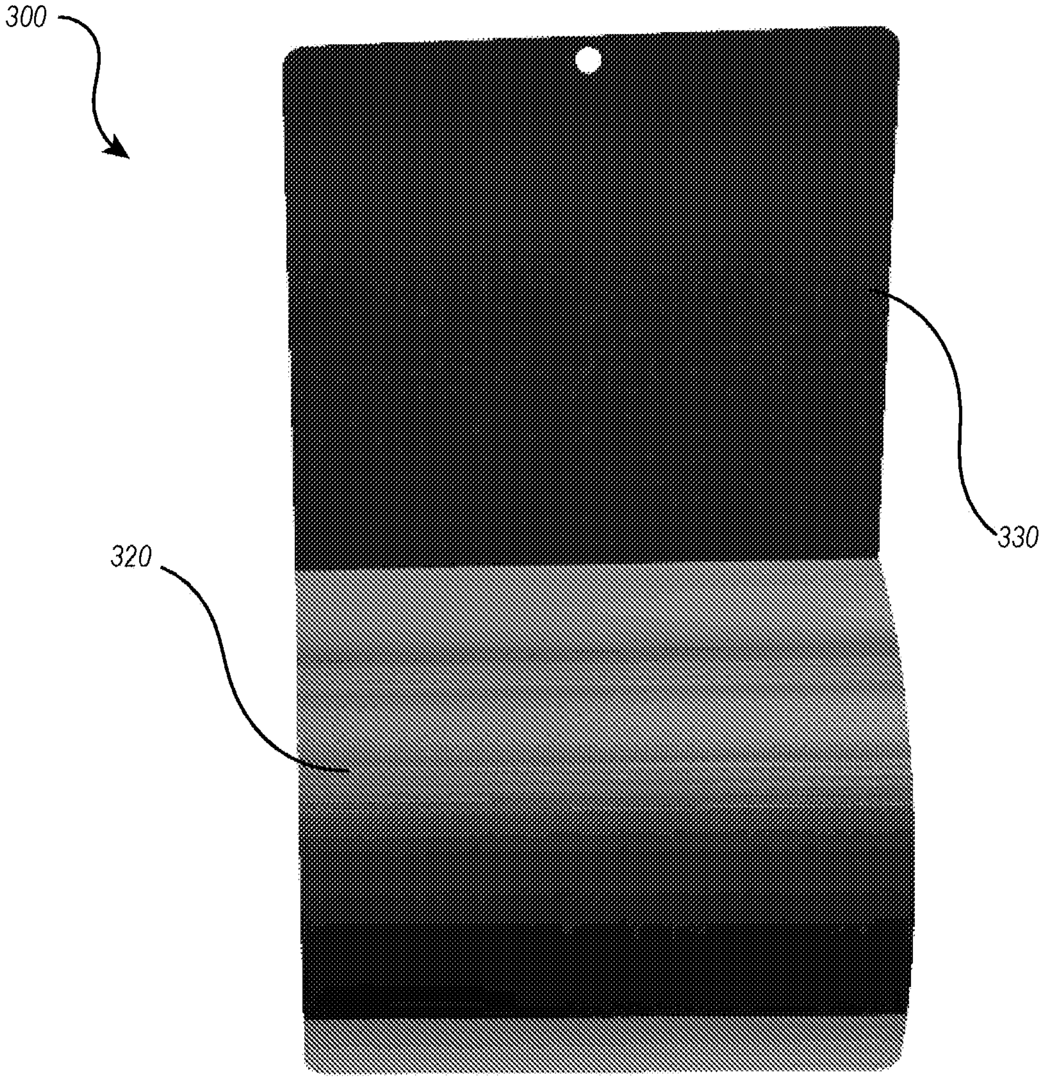
FIG. 3 illustrates another user interface for visualizing a first coated object and a second coated object having different morphology.

In another aspect, the digital harmony visualization provided by a user interface 300 may allow a viewer to evaluate an effect of morphology on color harmony between a first object 320 and a second object 330. As illustrated in FIG. 3, the first object 320 may comprise a curved panel that is oriented against the second object 330 comprising a flat panel. In the depicted example, the first object 320 and the second object 330 are provided with the same coating and only the spatial orientation, i.e., shape and position, differ between the objects 320, 330. While the viewer understands that the coatings are the same, the digital harmony visualization clearly conveys to the viewer how a perception of the coatings changes in dependence on an orientation of the objects 320, 330.

This may be particularly advantageous where a first object 320 and a second object 330 are manufactured separately and later joined together. While it may be assumed that applying the same coating to both the first object 320 and the second object 330 would result in the objects 320, 330 being perceived as the same color when fixed together, that is not always the case due to color flop and similar effects that can change the perception of a same coating in dependence on their respective object's relative orientation. By providing a digital harmony visualization according to the current disclosure, such disadvantages can be avoided without the need for in-person, trial and error comparisons of objects, such as in harmony reviews subject to sunlight conditions or requiring diffuse light booths.

Additionally, in some cases, a viewer may be able to individually manipulate an orientation or shape of an object of the digital harmony visualization. For example, the user interface 300 may allow a viewer to rotate or otherwise move the objects relative to one another, to select whether the objects are displayed as a rendering of their actual form (e.g., a fender and a bumper) and/or as virtual panels, or to change the morphology of one or more of the objects by introducing a curve or similar variation in the given object. For instance, the viewer may be able to increase or decrease a curve of the first object 320. In response, the rendering engine 122 renders the object in the new configuration. The resulting digital harmony visualization may provide the viewer with increased information on the impact of shape and position on a color harmony.

Figure 4A:
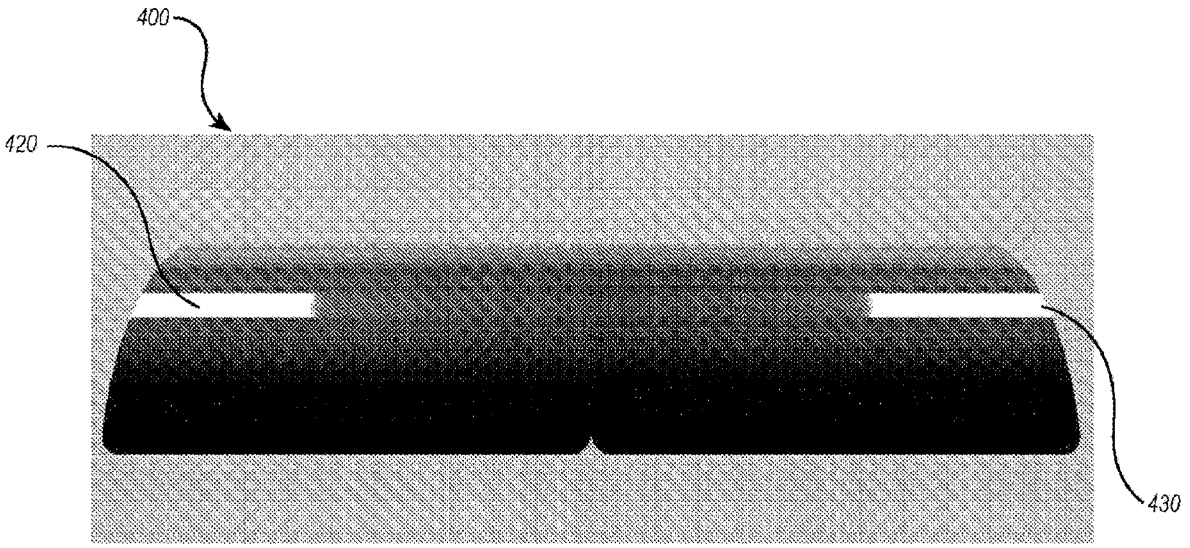
FIG. 4A illustrates another user interface for visualizing a first coated object and a second coated object under diffuse daylight.
Figure 4B:
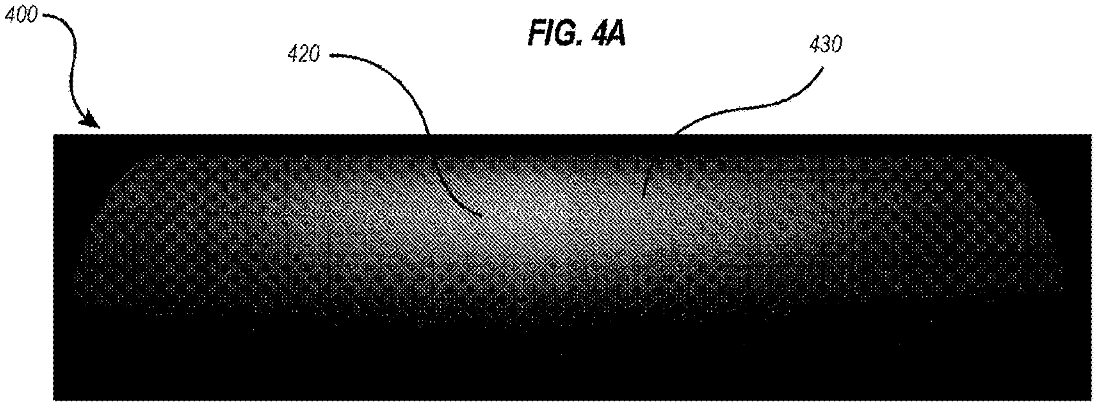
FIG. 4B illustrates the user interface of FIG. 4A for visualizing the first coated object and the second coated object under point daylight.
Figure 4C:
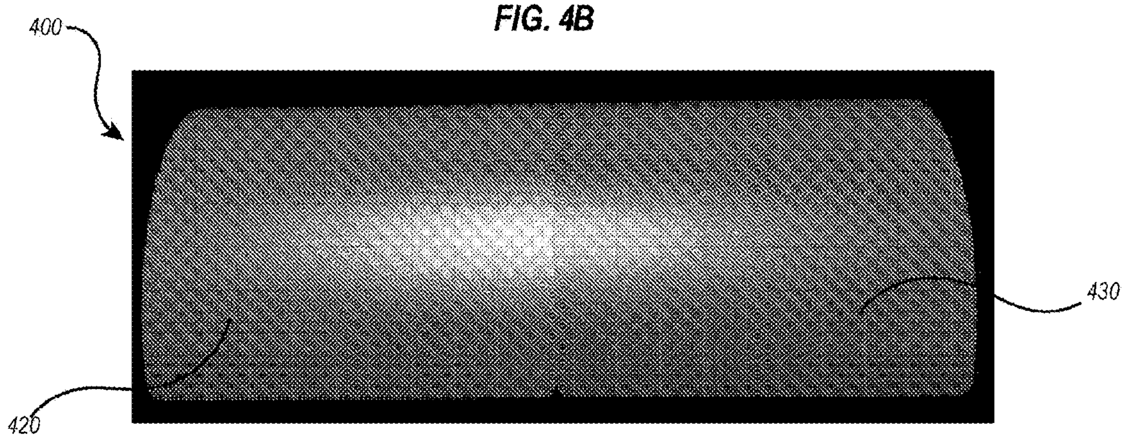
FIG. 4C illustrates the user interface of FIG. 4A for visualizing the first coated object and the second coated object under point incandescent light.

In another aspect, a digital harmony visualization may be provided by a user interface 400 displaying a comparison of a first object 420 and a second object 430 under different light sources, as depicted in FIGS. 4A-4C. FIG. 4A illustrates the first object 420 and the second object 430 comprising different coatings in diffuse daylight. As shown, the first object 420 and the second object 430 appear to be substantially identical in the diffuse daylight, such that even a known color harmony review in certain conditions may determine that the coatings are in harmony. However, as seen in the point daylight of FIG. 4B or the point incandescent light of FIG. 4C, the coatings may not be acceptable for use together in all lighting conditions, for example in a showroom illuminated with point daylight or point incandescent light.

A viewer may be able to manipulate and/or create custom light sources. For example, a user interface 400 may include light source selection elements allowing a viewer to select the number of light sources, the type of light sources (e.g., LED, neon, sunlight, diffuse, dusk, collimated, ambient, etc.), the location of the light sources with respect to each of the objects, an angle of incidence of the light sources with respect to each of the objects, and various other variables related to the lighting. When a viewer makes a customization to the light source using the user interface 400, the rendering engine 122 may re-render all of the objects 420, 430 so that the same lighting variables are applied to each of the objects 420, 430. In this way, each of the objects 420, 430 is independently rendered to include the same environmental attributes of each of the other objects 420, 430. Alternatively, when a viewer makes a customization to the light source using the user interface 400, the rendering engine 122 may re-render only a selection of the objects 420, 430 so that different lighting variables are applied to the objects 420, 430. In this way, each of the objects 420, 430 is independently rendered side-by-side to include different environmental attributes. As such, a viewer is able to appreciate the impact that changes in lighting have on each individual object in comparison to other objects.

A viewer may be able to customize surrounding conditions for performing a simulation or a digital harmony visualization according to the present disclosure. In this manner, a user may select one or more light sources from the type of light sources and specify a relative position of the light source or light sources, each of the objects, a viewpoint position, and surrounding environmental characteristics. Each of the components in the visualization may be independently adjustable, such that the light source or each of the light sources, each of the objects, and the viewpoint or observer position may be freely rotated or repositioned through the user interface. In this way, each of the components is independently rendered and re-rendered to reflect changes for each of the other components. This independent and dynamic control allows a user to simulate a variety of conditions in the digital harmony visualization, as well as adjust surrounding conditions in the visualization. For example, the surrounding conditions may be selected to simulate a diffuse light booth, to simulate a point light source, to simulate a mixture of lighting conditions or light sources, to simulate reflective effects of a surrounding environment, or the like. In like manner, a light source may be positioned behind a viewpoint or observer position, on an opposite side of the object relative to the viewpoint position, etc., to further simulate possible lighting conditions.

The independent rotation and/or positioning of each of the objects, the viewpoint position, and the light source provides numerous advantages and benefits in evaluating harmony between objects and/or coatings. This may be particularly evident where coatings include differing spray orientations, such that the viewpoint position and the light source position combine to result in possibly dramatic differences in appearance. In the described digital harmony visualization, each pixel may be adjusted for the particular conditions at that point, enabling an observer to clearly and completely evaluate color harmony for objects and coatings as they would or could appear in real world conditions.

Figure 5A:
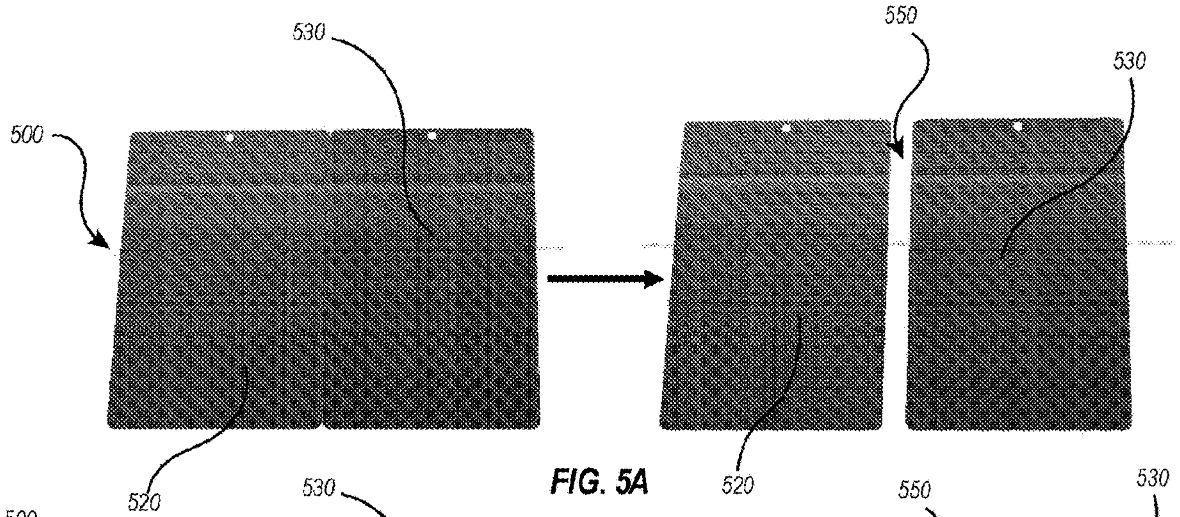
FIG. 5A illustrates another user interface for visualizing a first coated object and a second coated object spaced apart at varying distances.
Figure 5B:
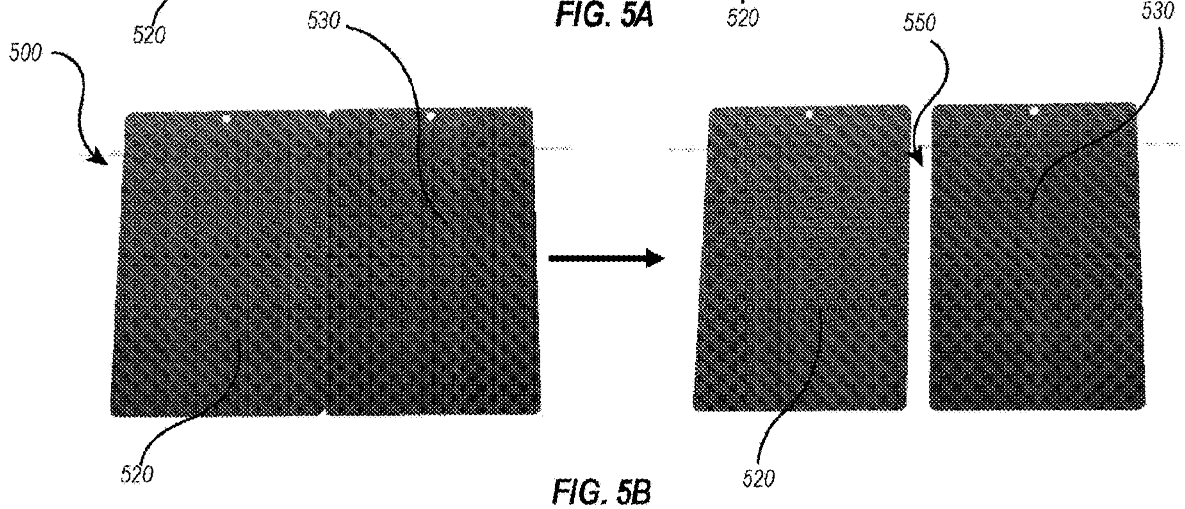
FIG. 5B illustrates the user interface of FIG. 5A for visualizing another first and second coated object spaced apart at varying distances.
Figure 5C:
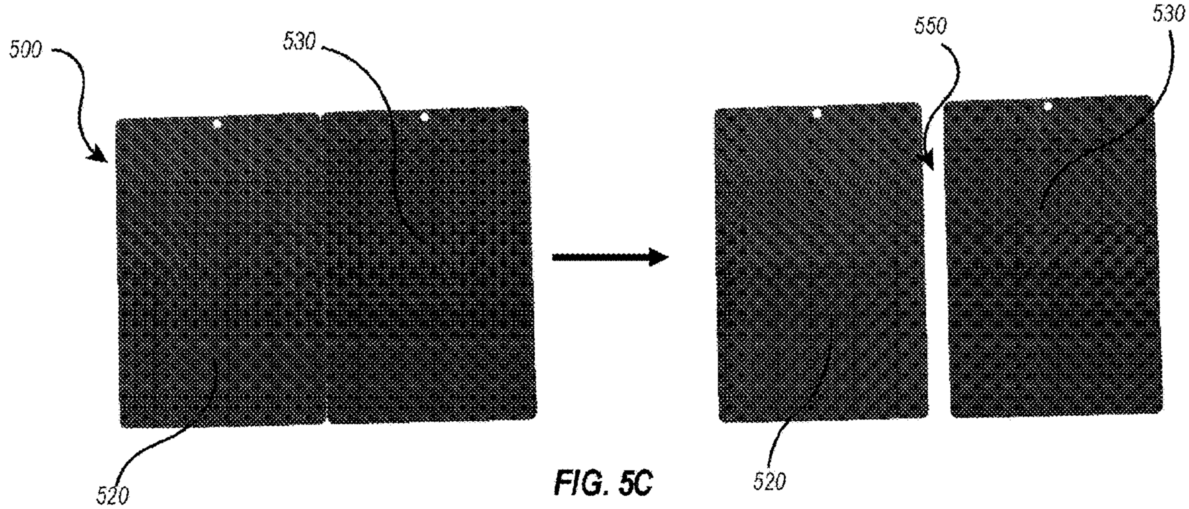
FIG. 5C illustrates the user interface of FIG. 5A for visualizing another first and second coated object spaced apart at varying distances.

As shown in FIGS. 5A-5C, a digital harmony visualization according to the present disclosure may further be applied to evaluate an effect of distance between objects on a perceived color harmony. A user interface 500 according to FIGS. 5A-5C may present a first object 520 and a second object 530 having different coatings but with a varying distance, or gap 550, between them. While each set of objects 520, 530 are not "color correct," which is clearly perceived in a side-by-side comparison, tolerance for differences between coatings of the first object 520 and the second object 530 may increase as a gap 550 or distance between the objects 520, 530 is increased.

In one aspect, the gap 550 may be determined by an actual, real-world gap between parts of a car (e.g. a ¼" gap between a hood and a fender). Accordingly, a viewer may accept a color harmony between different coatings for a first object 520 and a second object 530 that are separated by a predetermined distance at predetermined orientations and angles, such as by a trim component between a bumper and a fender.

Figure 6A:
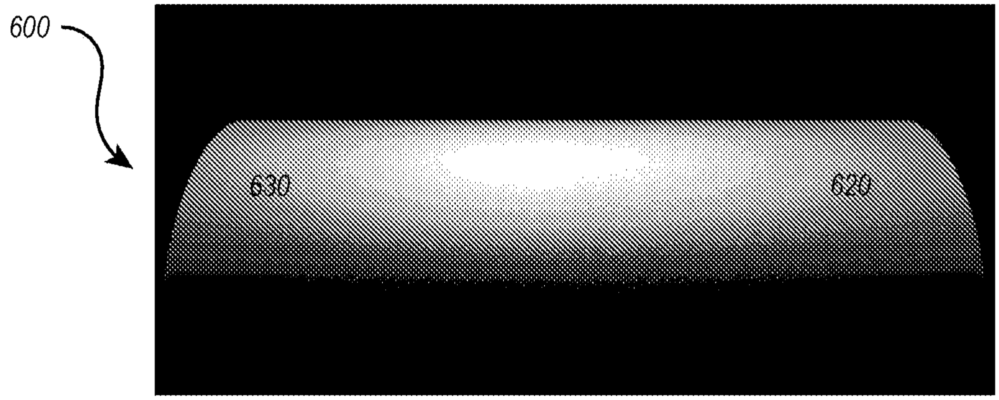
FIG. 6A illustrates another user interface for visualizing a first coated object and a second coated object each having a spray orientation of 0 degrees.
Figure 6B:
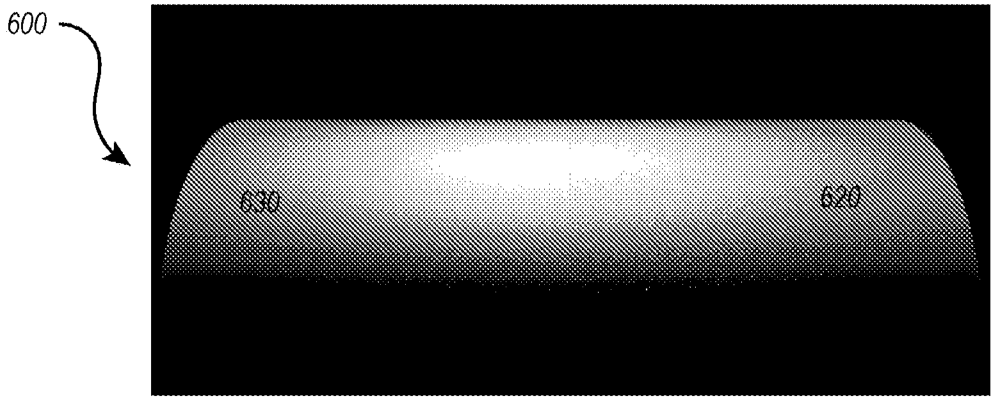
FIG. 6B illustrates the user interface of FIG. 6A for visualizing the first coated object having a spray orientation of 90 degrees and the second coated object having a spray orientation of 0 degrees.
Figure 6C:
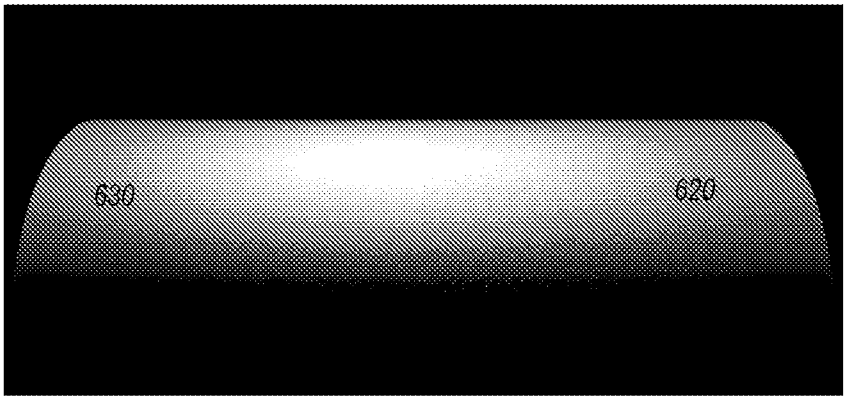
FIG. 6C illustrates the user interface of FIG. 6A for visualizing the first coated object having a spray orientation of 180 degrees and the second coated object having a spray orientation of 0 degrees.

A digital harmony evaluation may be performed to show the impact of varying application means on visual appearance of a coating. FIGS. 6A-6C depict a user interface 600 showing a first object 620 and a second object 630 where a spray orientation during application of a coating of the first object 620 is varied. In FIG. 6A, the spray orientation of the coatings applied to both the first object 620 and the second object 630 are the same, defined at 0 degrees rotation. In FIG. 6B the spray orientation of the coating applied to the first object 620 is changed to 90 degrees rotation while the spray orientation of the coating applied to the second object 630 is maintained at 0 degrees. FIG. 6C further illustrates the first object 620 and the second object 630 where the spray orientation of the coating applied to the first object 620 is changed to 180 degrees rotation while the spray orientation of the coating applied to the second object 630 is maintained at 0 degrees.

A first object 620 and a second object 630 may be compared as still images or as an animation. For example, while shown as a comparison of multiple still images, FIGS. 6A-6C may be configured as an animation where the first object 620 is shown with varying spray orientation of the same material as in FIGS. 6A-6C. In this manner, a viewer is able to progressively gain insightful information on the impact of spray orientation on color harmony.

Figure 7:
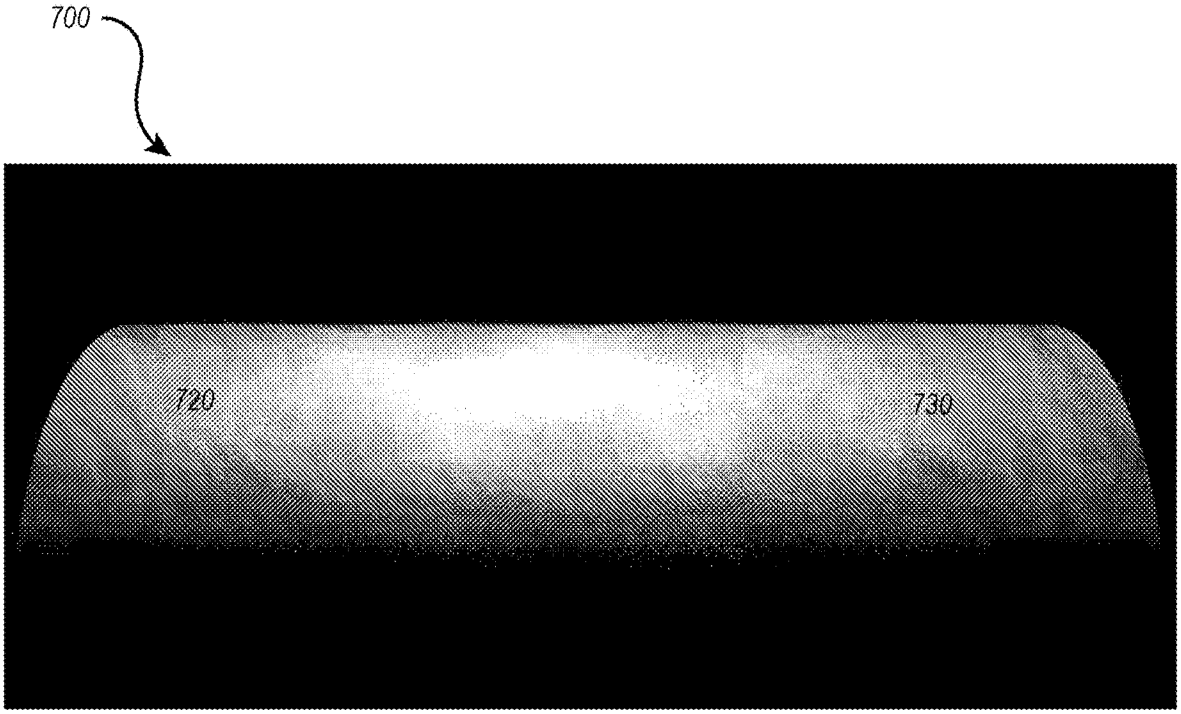
FIG. 7 illustrates another user interface for visualizing a first coated object and a second coated object comprising simulated weathering of the first coated object.

FIG. 7 illustrates another user interface 700 where a first object 720 is compared to a second object 730, where the second object 730 comprises the same first object 720 having undergone a simulated weathering. Simulated weathering may comprise variations in certain color areas, such as DE, DL, Da, Db changes, based on data science predictions of weathering and similar analysis. Weathering predictions may be based on a combination of time and climate characteristics or similar variables and may be customized by age and/or geographic location. Customization of the simulated weathering may include querying a database regarding particular weathering conditions, as would be understood by one skilled in the art from the present disclosure. For example, a user may select a particular geographic region and a particular age period to facilitate a query of the weathering database, such that a selection of a Rocky Mountain region may then reflect weathering expected from exposure to high altitude, dry air, freezing temperatures, and other conditions of the region over the given age period (e.g., exposure to snow, salt or chemicals on roadways).

A viewer may be able to visualize and gain insightful information on an expected appearance of a coated object after predicted weathering effects, such as when selecting a coating for use with an object. Similarly, a viewer may be informed by a digital harmony evaluation including simulated weathering when selecting a coating for a new object to be added with an older part. For example, the second object 730 may comprise an existing part of a vehicle, such as a bumper or body, which has undergone weathering effects while the first object 720 may comprise a newly ordered part for addition to the vehicle. In this case, a viewer may review possible coatings for the new part, the second object 730, with insightful information on color harmony with an existing weathered part.

Figure 8:
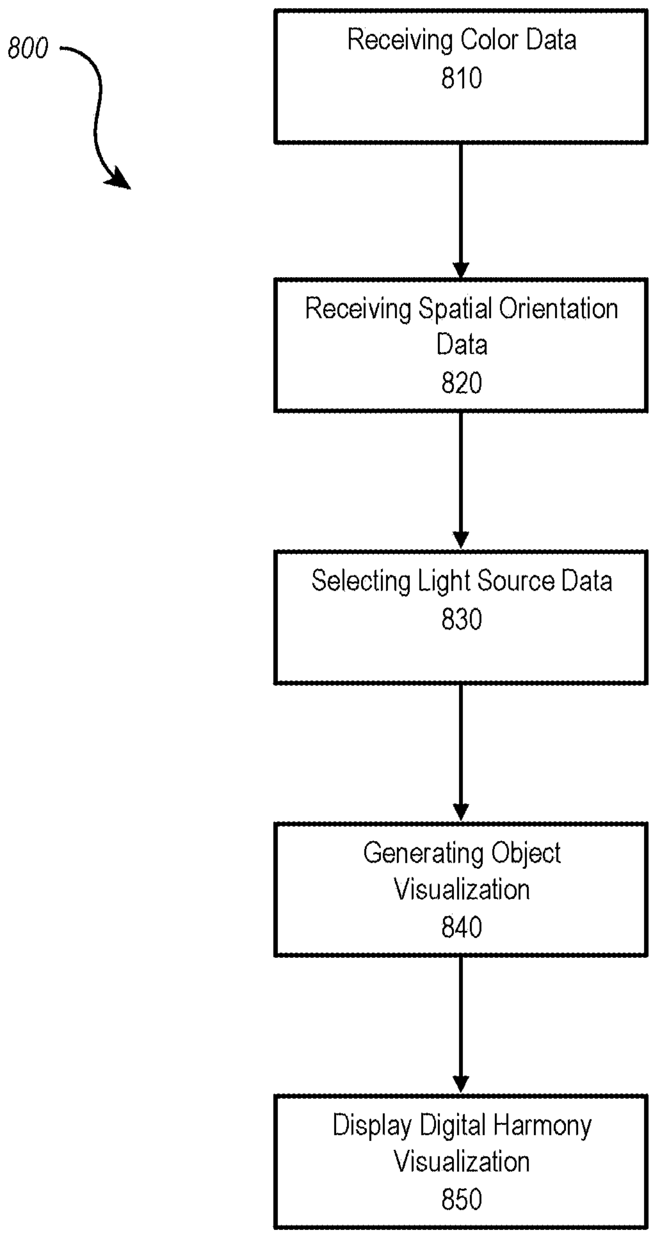
FIG. 8 illustrates a flowchart of a method for generating a digital harmony visualization.

FIG. 8 illustrates a flowchart of a method 800 for generating a digital harmony visualization of a first physical object and a second physical object. Method 800 includes receiving or selecting first color data for the first physical object and second color data for the second physical object 810, such as from coating database 126. The color data may comprise identification of the color/coating used, including data related to the mixture forming the coating, chemical ingredients, identification of the color or colorants/pigments used, orientation of the spray, texture from different substrates, and/or measurement data from a coating standard. First spatial orientation data for the first physical object and second spatial orientation data for the second physical object may be received or selected at step 820. The spatial orientation data may comprise a three-dimensional shape, size, orientation and position of an object in a coordinate space (e.g., CADD or similar rendering data), such as a virtually rendered space, and may be received or selected from an object database 124 or provided as a custom model or user-defined object. The spatial orientation data may be determined with respect to an observer or viewpoint position, such as a single observer position, from which a rendering may be prepared.

In step 830 light source data may be received or selected for use with the color data and the spatial orientation data of the objects. The light source data may be used to modify the color data in a given rendering (e.g., with respect to anisotropy, metamerism, brightness, color, etc.) and may comprise a digital representation of light sources in a three-dimensional space (e.g., intensity, clarity, position, orientation, etc.). For example, color data may include spectral information captured under specific illumination conditions at a pixel level and selected light source data may be applied to modify each pixel of a given rendering. Multiple light sources may be selected, for example from sunlight of varying intensity and clarity, point light, diffuse light, incandescent light, fluorescent light, LED light, etc.

It should be noted that, while described as discrete steps, varying examples may include iteratively receiving or selecting color data and/or spatial orientation data and/or light source data. In like manner, a viewer may not be restricted to a single selection and may, for example, be able to rotate, manipulate, or otherwise modify a selected color or object in the rendering as has been described previously.

Step 840 may comprise generating a first visualization for the first physical object based on the first color data, the first spatial orientation data and the light source data, and generating a second visualization for the second physical object based on the second color data, the second spatial orientation data and the light source data. The first visualization and the second visualization may be generated in a common virtual space or in separate virtual spaces. In like manner, the light source data for the first visualization and the second visualization may be the same light source data or different light source data, according to an intended use.

A digital harmony visualization comprising the first visualization and the second visualization may be rendered or displayed on a graphical user interface at step 850. The digital harmony visualization may comprise an overlay of the first visualization and the second visualization, a side-by-side presentation of the first visualization and the second visualization, or the first visualization and the second visualization may be rendered together in a common virtual space.

Figure 9:
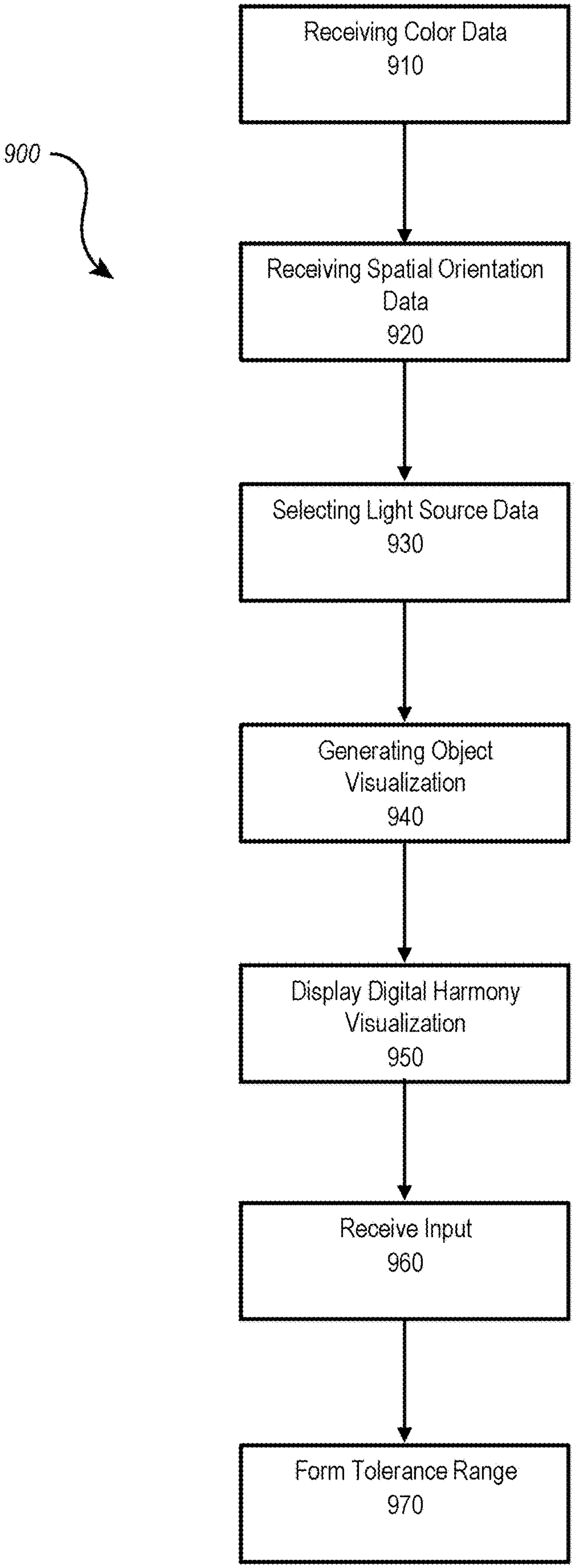
FIG. 9 illustrates a flowchart of a method for generating a digital harmony visualization for forming a tolerance range.

Furthermore, FIG. 9 illustrates a flowchart of a method 900 for generating a digital harmony visualization of a first physical object and a second physical object for determining a harmony tolerance. Method 900 includes receiving or selecting first color data for the first physical object and second color data for the second physical object 910, and receiving or selecting first spatial orientation data for the first physical object and second spatial orientation data for the second physical object at step 920, similar to the method 800. In step 930 light source data may be received or selected for use with the color data and the spatial orientation data of the objects in determining a tolerance range.

Step 940 may comprise generating a first visualization for the first physical object based on the first color data, the first spatial orientation data and the light source data, and generating a second visualization for the second physical object based on the second color data, the second spatial orientation data and the light source data. A digital harmony visualization comprising the first visualization and the second visualization may be rendered or displayed on a graphical user interface at step 950. In step 960 input may be received at the user interface defining the digital harmony visualization as acceptable or unacceptable. For example, a viewer may review the digital harmony visualization and accept or reject the compatibility of the coated objects shown based on their colors or combined general appearance.

At step 970 the digital harmony visualization and the input may be stored in a memory to form a tolerance range, such as a harmony tolerance range for given colors and/or for given light sources and/or relative positions and/or relative orientations of the described components in the visualization. In this manner, the method may facilitate the creation of a tolerance range defining acceptable combinations of coatings or colors, for example a standardized tolerance range for harmony, based on a response from viewers over time. The tolerance range may be dynamically updated or may be established from a standardized set of digital harmony visualizations. The tolerance range may be employed to provide suggested coatings, colors, spray orientations, or other features following the selection of initial color data and orientation of a first object. In this manner, the tolerance range may provide suggested coatings or colors for harmony with another coating or color, for objects of a given position, orientation, or light source conditions.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. Within the scope of the present invention are also included physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, within the practice of the invention at least two distinctly different kinds of computer-readable media can be used: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some examples, such as a cloud-computing environment, may comprise a system that includes one or more hosts that are each capable of running one or more virtual machines. During operation, virtual machines emulate an operational computing system, supporting an operating system and perhaps one or more other applications as well. In some examples, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computerized method for generating a digital harmony visualization of a first physical object and a second physical object for use on a computer system comprising one or more processors and one or more computer-readable media having stored thereon executable instructions that when executed by the one or more processors configure the computer system to perform the computerized method for generating the digital harmony visualization, the computerized method comprising:

receiving first color data for the first physical object;

receiving a first spatial orientation for the first physical object;

receiving second color data for the second physical object;

receiving a second spatial orientation for the second physical object;

selecting light source data;

generating a first visualization for the first physical object based on the first color data, the first spatial orientation and the light source data;

generating a second visualization for the second physical object based on the second color data, the second spatial orientation and the light source data;

simulating one or more environmental conditions on the digital harmony visualization; and displaying on a graphical user interface a digital harmony visualization comprising the first visualization of the first physical object and the second visualization of the second physical object for comparison under the one or more environmental conditions.

2. The computerized method as recited in claim 1, wherein receiving first color data for the first physical object includes identifying the first color data for the first physical object from a coatings database, the first color data including a first spray orientation of a colorant material; and wherein receiving second color data for the second physical object includes identifying the second color data for the second physical object from the coatings database, the second color data including a second spray orientation of a colorant material.

3. The computerized method as recited in claim 1, wherein the first color data and the second color data each include a spray orientation of a colorant material.

4. The computerized method as recited in claim 1, wherein the first spatial orientation and the second spatial orientation are dynamically determined relative to a selected observer position, the first spatial orientation and the second spatial orientation being different.

5. The computerized method as recited in claim 1, wherein the first spatial orientation and the second spatial orientation are identified from an object database, such that the first spatial orientation and the second spatial orientation are based on a relative position of the first physical object and the second physical object in a physical assembly.

6. The computerized method as recited in claim 1, wherein the digital harmony visualization further comprises a predetermined space between the first visualization and the second visualization, the predetermined space identified from an object database, such that the predetermined space is based on an existing distance between the first physical object and the second physical object in a physical assembly.

7. The computerized method as recited in claim 1, wherein receiving the second color data further comprises processing the first color data through a weathering analysis, wherein the weathering analysis generates changes in predetermined color areas of the first color data for forming the second color data.

8. The computerized method as recited in claim 1, wherein the first physical object comprises a portion of a vehicle and the second physical object comprises an adjacent portion of the vehicle.

9. The computerized method as recited in claim 8, wherein the first physical object comprises a bumper of a vehicle and the second physical object comprises an adjacent body of the vehicle.

10. The computerized method as recited in claim 3, wherein the spray orientation of the first color data is different from the spray orientation of the second color data.

11. The computerized method as recited in claim 1, wherein the digital harmony visualization comprises the first visualization overlaying the second visualization.

12. The computerized method as recited in claim 1, wherein selecting light source data includes identifying or selecting the light source data from a lighting conditions data library and selecting a light source position relative to the first physical object, the second physical object, and an observer position.

13. The computerized method as recited in claim 1, wherein the light source data comprises sunlight point light data, sunlight diffuse light data, incandescent light data, fluorescent light data, color brightness data, and/or color temperature data.

14. The computerized method as recited in claim 1, wherein the graphical user interface comprises a printing device or a display device and displaying the digital harmony visualization includes:

defining color properties of the printing device or the display device;

processing the first visualization and the second visualization based on the defined color properties; and sending the processed first visualization and the processed second visualization to the printing device or display device for printing and/or display.

15. The computerized method as recited in claim 1, the computerized method further comprising:

receiving an input through an interface element defining the digital harmony visualization as acceptable or unacceptable; and storing the digital harmony visualization and the input in a memory to form a tolerance range.

16. The computerized method as recited in claim 1, wherein receiving second color data for the second physical object and receiving a second spatial orientation for the second physical object is based on a suggested second coating within a tolerance range of the first color data for the first physical object and the first spatial orientation for the first physical object.

17. The computerized method as recited in claim 1, the computerized method further comprising:

dynamically updating the digital harmony visualization based on changes in an orientation of the first spatial orientation for the first physical object, in the second spatial orientation for the second physical object, in an observer position, and/or in a light source position.

18. One or more non-transitory computer-readable storage media having stored thereon computer-executable instructions that are executable by one or more processors of a computer system to configure the computer system to at least:

receive first color data for a first physical object;

receive a first spatial orientation for the first physical object;

receive second color data for a second physical object;

receive a second spatial orientation for the second physical object;

select light source data;

generate a first visualization for the first physical object based on the first color data, the first spatial orientation and the light source data;

generate a second visualization for the second physical object based on the second color data, the second spatial orientation and the light source data;

simulating one or more environmental conditions on the digital harmony visualization; and display on a graphical user interface a digital harmony visualization comprising the first visualization of the first physical object and the second visualization of the second physical object for comparison under the one or more environmental conditions.

19. A computer system for performing a digital harmony evaluation of a first physical object and a second physical object through a user interface, comprising:

one or more processors; and one or more computer-readable media having stored thereon executable instructions that when executed by the one or more processors configure the computer system to at least:

receive first color data for a first physical object;

receive a first spatial orientation for the first physical object;

receive second color data for a second physical object;

receive a second spatial orientation for the second physical object;

select light source data;

generate a first visualization for the first physical object based on the first color data, the first spatial orientation and the light source data;

generate a second visualization for the second physical object based on the second color data, the second spatial orientation and the light source data;

simulating one or more environmental conditions on the digital harmony visualization; and display on a graphical user interface a digital harmony visualization comprising the first visualization of the first physical object and the second visualization of the second physical object for comparison under the one or more environmental conditions.

* * * * *